(12) United States Patent
Van De Weyer et al.

(10) Patent No.: US 8,468,606 B2
(45) Date of Patent: Jun. 18, 2013

(54) SECURITY HANDLING BASED ON RISK MANAGEMENT

(75) Inventors: Yves Van De Weyer, Leuven (BE); David Spencer Tyree, Centreville, VA (US); Henk Van Wulpen, Oedelem (BE)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 530 days.

(21) Appl. No.: 12/633,401

(22) Filed: Dec. 8, 2009

(65) Prior Publication Data

US 2011/0138471 A1 Jun. 9, 2011

(51) Int. Cl.
*G06F 21/00* (2006.01)

(52) U.S. Cl.
USPC ............... 726/25; 726/26; 726/27; 726/28; 726/2; 726/30; 713/187; 713/188; 713/189

(58) Field of Classification Search
USPC .......................................................... 726/25
See application file for complete search history.

(56) References Cited

U.S. PATENT DOCUMENTS

| | | | |
|---|---|---|---|
| 7,752,125 B1* | 7/2010 | Kothari et al. | 705/38 |
| 2003/0084349 A1* | 5/2003 | Friedrichs et al. | 713/201 |
| 2006/0248186 A1* | 11/2006 | Smith | 709/224 |
| 2007/0129893 A1* | 6/2007 | McColl et al. | 702/19 |
| 2010/0095235 A1* | 4/2010 | Bennett et al. | 715/781 |

* cited by examiner

*Primary Examiner* — Longbit Chai

(57) ABSTRACT

A security device may receive information relating to a security event in a customer network. The security device may further determine, in response to receiving the information, a likelihood score that reflects a likelihood that the security event will succeed and an impact score that provides an indication of an impact that the security event will have on the customer network. The security device may also determine a risk score based on the likelihood score and the impact score, where the risk score provides an indication of a risk that the security event will affect the customer network. The security device may provide the risk score to a customer associated with the customer network.

21 Claims, 10 Drawing Sheets

SECURITY HANDLING BASED ON RISK MANAGEMENT

BACKGROUND INFORMATION

Businesses often use security devices, such as firewalls and network intrusion systems, to detect threats against the businesses' networks. Once a threat is detected, a network administrator may perform remedial measures to prevent or stop a network attack.

DETAILED DESCRIPTION OF PREFERRED EMBODIMENTS

The following detailed description of embodiments refers to the accompanying drawings. The same reference numbers in different drawings may identify the same or similar elements. Also, the following detailed description does not limit the invention.

There are hundreds of ways to attack devices, but determining if an attack is aimed at compromising a device's confidentiality, integrity, and/or availability; causing a system wide outage; and/or stealing confidential customer information, is far more difficult. There is an increased importance to evaluate what the risk is to a business if a certain asset gets compromised.

Figure 1:
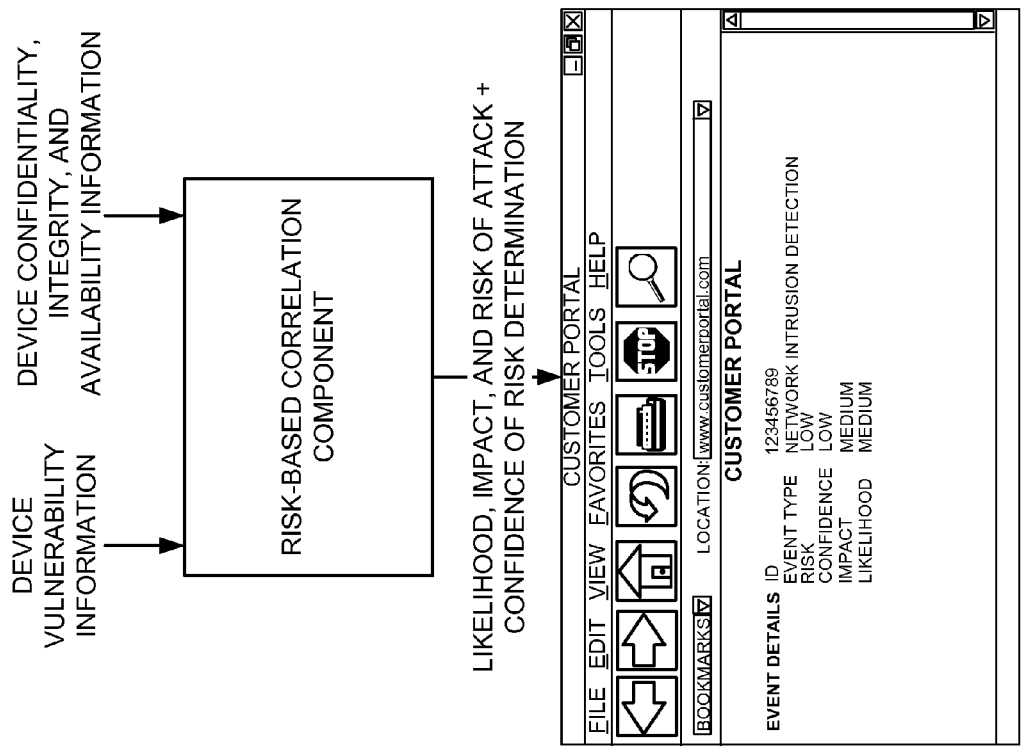
FIG. 1 is an exemplary diagram illustrating a concept described herein.

FIG. 1 is an exemplary diagram illustrating a concept described herein. A risk-based correlation component may be provided that determines a risk of a detected security event (e.g., a possible intrusion detection) affecting a customer's business. In one implementation, the risk-based correlation component may receive information regarding a vulnerability of a device (to which the possible network attack is directed) and information regarding a criticality of the device with respect to confidentiality, integrity, and availability. The risk-based correlation component may use this information, along with information regarding the detected security event, to determine the likelihood that the detected security event will be successful and the impact that the security event may have on the customer's business. The risk-based correlation component may further use the likelihood and impact determinations to determine a risk of the security event on the customer's business. The risk-based correlation component may provide the likelihood determination, the impact determination, and the risk determination to the customer via a customer portal, along with an indication of the confidence level with which the risk determination was made. In this way, the customer may be made aware of how a particular security event may affect the customer's business.

Figure 2:
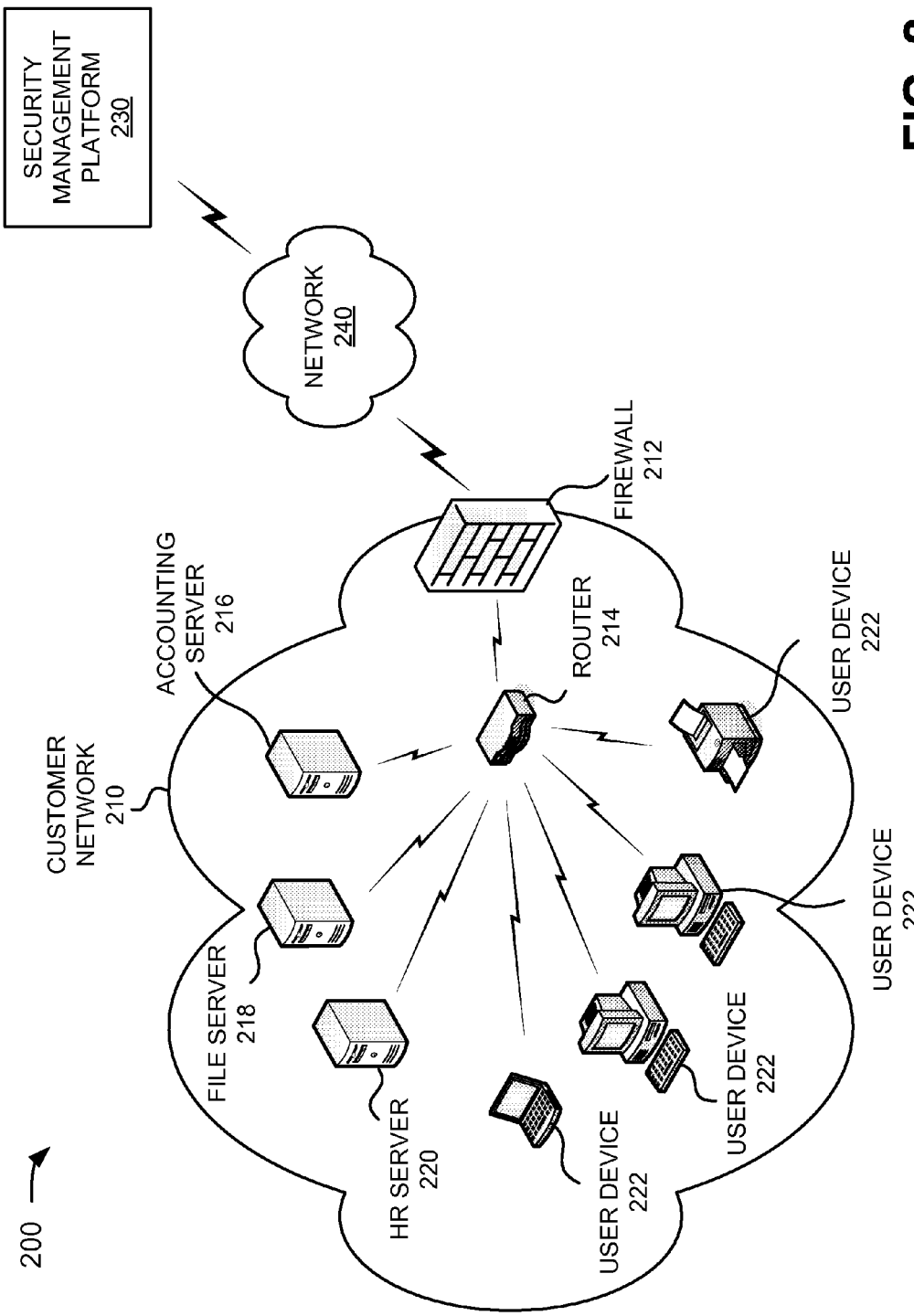
FIG. 2 is an exemplary network in which systems and/or methods described herein may be implemented.

FIG. 2 is an exemplary network 200 in which systems and/or methods described herein may be implemented. As illustrated, network 200 may include a customer network 210 that may connect to a security management platform 230 via a network 240.

Customer network 210 may include a local area network (LAN), a metropolitan area network (MAN), a wide area network (WAN), a private network, an intranet, and/or another type of network that may be associated with a customer's business. As illustrated, customer network 210 may include the following exemplary components: a firewall 212, a router 214, an accounting server 216, a file server 218, a human resources (HR) server 220, and a group of user devices 222. Firewall 212, router 214, accounting server 216, file server 218, HR server 220, and user devices 222 may also be referred to as the customer's assets hereinafter.

Firewall 212 may include one or more devices that control the flow of traffic between different networks and protect customer network 210 from undesired traffic that may be generated by hackers, viruses, spy ware, spam, and denial of service attacks. Firewall 212 may further protect the customer's assets from traffic originating on network 240. Firewall 212 may permit or deny traffic based upon a set of rules. In one implementation, firewall 212 may detect security events (e.g., network intrusions) and send information relating to the detected security events to security management platform 230. Firewall 212 may connect to router 214 and/or other components of customer network 210 via wired and/or wireless connections.

Router 214 may include one or more devices that receive traffic from a component in customer network 210 and route the traffic toward the appropriate destination(s). In one implementation, router 214 may include an intrusion detection sensor that may detect security events (e.g., denial of service attacks, port scans, attempts to hack into the customer's assets to gain access to sensitive information, and/or other types of security events) and send information relating to the detected security events to security management platform 230. Router 214 may connect to other components in customer network 210 via wired and/or wireless connections.

Accounting server 216 may include one or more server devices that maintain financial information for the customer's business. Accounting server 216 may include a server, a mainframe computer, a desktop computer, a laptop computer, and/or another type of computational device. In one implementation, accounting server 216 may include an intrusion detection sensor that may detect security events (e.g., denial of service attacks, port scans, attempts to hack into the customer's assets to gain access to sensitive information, and/or other types of security events) and send information relating to the detected security events to security management platform 230. Accounting server 216 may connect to router 214 and/or other components in customer network 210 via wired and/or wireless connections.

File server 218 may include one or more server devices that maintain data files for the customer's business. File server 218 may include a server, a mainframe computer, a desktop computer, a laptop computer, and/or another type of computational device. In one implementation, file server 218 may include an intrusion detection sensor that may detect security events (e.g., denial of service attacks, port scans, attempts to hack into the customer's assets to gain access to sensitive information, and/or other types of security events) and send information relating to the detected security events to security management platform 230. File server 218 may connect to router 214 and/or other components in customer network 210 via wired and/or wireless connections.

HR server 220 may include one or more server devices that maintain human resource information for the customer's business. HR server 220 may include a server, a mainframe computer, a desktop computer, a laptop computer, and/or another type of computational device. In one implementation, HR server 220 may include an intrusion detection sensor that may detect security events (e.g., denial of service attacks, port scans, attempts to hack into the customer's assets to gain access to sensitive information, and/or other types of security events) and send information relating to the detected security events to security management platform 230. HR server 220 may connect to router 214 and/or other components in customer network 210 via wired and/or wireless connections.

User devices 222 may include desktop computers, laptop computers, personal digital assistants (PDAs), printers, copiers, and/or other types of devices that may be part of a customer's business and may be accessed through customer network 210. In one implementation, one or more user devices 222 may include an intrusion detection sensor that may detect security events (e.g., denial of service attacks, port scans, attempts to hack into the customer's assets to gain access to sensitive information, and/or other types of security events) and send information relating to the detected security events to security management platform 230. User devices 222 may connect to router 214 and/or other components in customer network 210 via wired and/or wireless connections.

Although FIG. 2 shows exemplary components of customer network 210, in other implementations, network 200 and/or customer network 210 may include fewer components, different components, differently arranged components, or additional components than depicted in FIG. 2. Additionally, or alternatively, one or more components of customer network 210 may perform the tasks described as being performed by one or more other components of customer network 210.

Security management platform 230 may include one or more devices that receive information relating to a security event from customer network 210 and determine, for the security event, the likelihood that the attack will be successful, an impact that the attack may have on customer network 210, and a risk of the attack on customer network 210. In addition, security management platform 230 may provide a portal via which the customer may review the likelihood determination, the impact determination, and the risk determination, along with an indication of a confidence of the risk determination. Security management platform 230 may connect to network 240 via wired and/or wireless connections.

Network 240 may include one or more networks of any type, including a Public Land Mobile Network (PLMN), a Public Switched Telephone Network (PSTN), a LAN, a MAN, a WAN, a private network, the Internet, an intranet, and/or another type of network.

Although FIG. 2 shows exemplary components of network 200, in other implementations, network 200 may include fewer components, different components, differently arranged components, or additional components than depicted in FIG. 2. Additionally, or alternatively, one or more components of network 200 may perform the tasks described as being performed by one or more other components of network 200.

Figure 3:
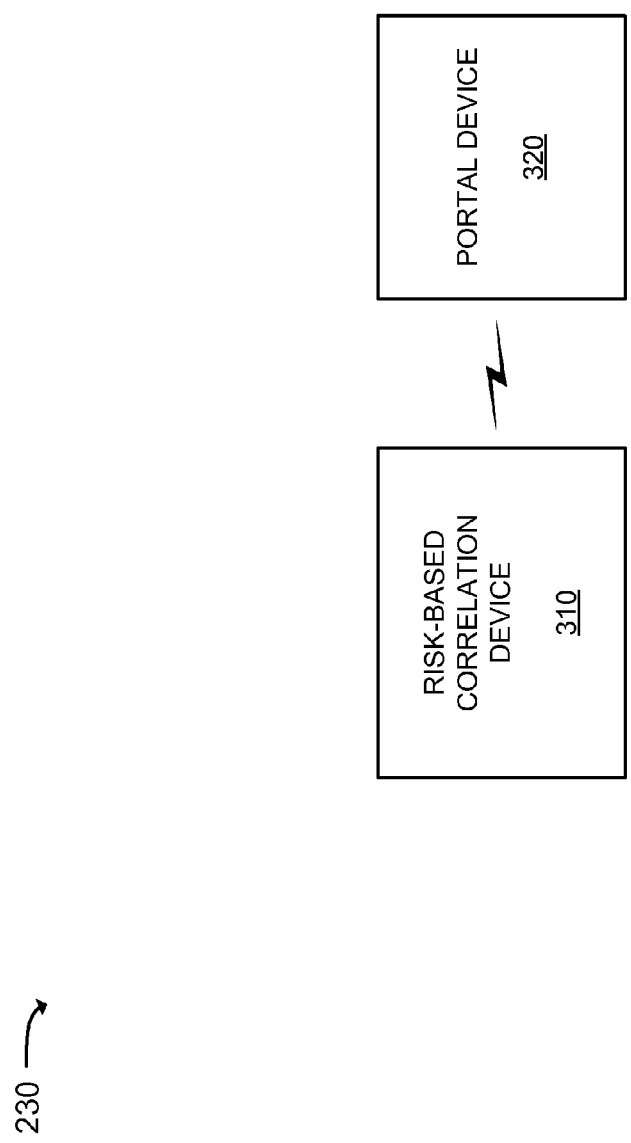
FIG. 3 is a diagram of exemplary components of a security management platform of FIG. 2.

FIG. 3 is a diagram of exemplary components of security management platform 230. As illustrated, security management platform 230 may include a risk-based correlation device 310 and a portal device 320.

Risk-based correlation device 310 may include one or more devices that receive information relating to a security event from customer network 210 and determine, for the security event, the likelihood that the attack will be successful, an impact that the attack may have on customer network 210, and a risk of the attack on customer network 210. Risk-based correlation device 310 may include, for example, one or more servers, mainframe computers, desktop computers, laptop computers, and/or another type of computational device.

Portal device 320 may include one or more devices that allow a customer to interact with security management platform 230. For example, portal device 320 may provide graphical user interfaces to a user device, such as one of user devices 222, which allow a customer to obtain information relating to security events. Portal device 320 may include, for example, one or more servers, mainframe computers, desktop computers, laptop computers, and/or another type of computational device.

Although FIG. 3 illustrates exemplary components of security management platform 230, in other implementations, security management platform 230 may include additional components, fewer components, different components, and/or differently arranged components than those illustrated in FIG. 3. Additionally, or alternatively, one component in FIG. 3 may perform one or more tasks described as being performed by another component in FIG. 3.

Figure 4:
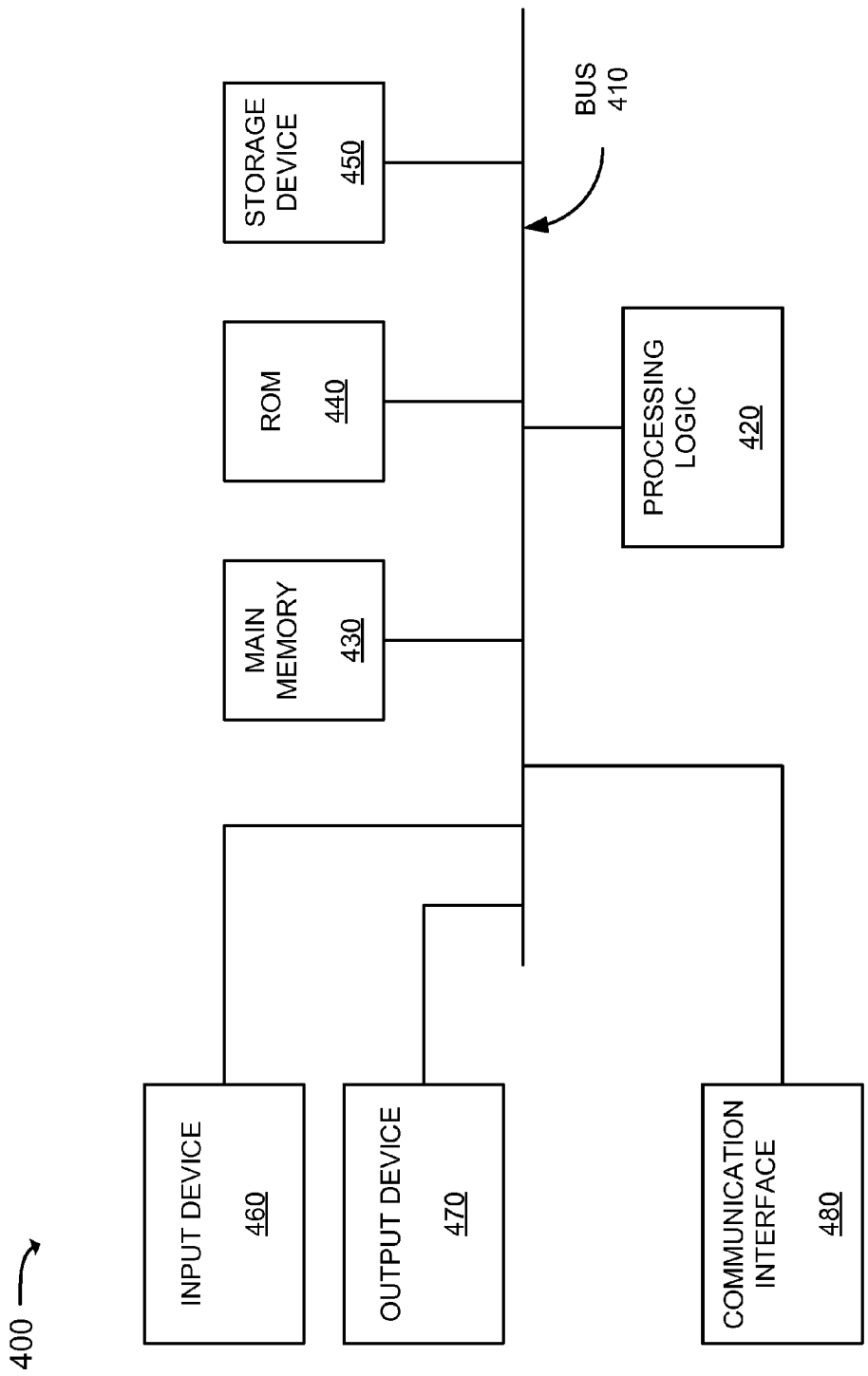
FIG. 4 is a diagram of exemplary components of a device.

FIG. 4 is a diagram of exemplary components of a device 400 that may correspond to one or more of the devices or components depicted in FIGS. 2 and 3. For example, device 400 may correspond to risk-based correlation device 310 and/or portal device 320. As illustrated, device 400 may include a bus 410, processing logic 420, a main memory 430, a read only memory (ROM) 440, a storage device 450, an input device 460, an output device 470, and a communications interface 480.

Bus 410 may permit communication among the components of device 400. Processing logic 420 may include one or more processors and/or microprocessors that interpret and executes instructions. In some implementations, processing logic 420 may be implemented as or include one or more application specific integrated circuit (ASICs), field programmable gate array (FPGAs), or the like. Main memory 430 may include a random access memory (RAM) or another type of dynamic storage device that stores information and instructions for execution by processing logic 420. ROM 440 may include a ROM device and/or another type of static storage device that stores static information and instructions for the processing logic 420. Storage device 450 may include a magnetic or optical recording medium and its corresponding drive for storing information and/or instructions.

Input device 460 may include a device that permits an operator to input information to device 400, such as a keyboard, a keypad, a mouse, a pen, a microphone, a touch screen display one or more biometric mechanisms, and the like. Output device 470 may include a device that outputs information to the operator, including a display, a printer, a speaker, etc.

Communication interface 480 may include any transceiver-like mechanism that enables device 400 to communicate with other devices and/or systems. For example, communication interface 480 may include mechanisms for communicating with another device or system via a network, such as network 210 or 240.

As described herein, device 400 may perform certain operations in response to processing logic 420 executing software instructions contained in a computer-readable medium, such as main memory 430. A computer-readable medium may correspond to, for example, a physical memory device or a logical memory device. A logical memory device may include memory space within a single physical memory device or spread across multiple physical memory devices residing on one or more devices.

The software instructions may be read into main memory 430 from another computer-readable medium or from another device via communication interface 480. The software instructions contained in main memory 430 may cause processing logic 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 illustrates exemplary components of device 400, in other implementations, device 400 may include additional components, fewer components, different components, and/or differently arranged components than those illustrated in FIG. 4. Additionally, or alternatively, one or more components in FIG. 4 may perform one or more tasks described as being performed by one or more other components in FIG. 4.

Figure 5:
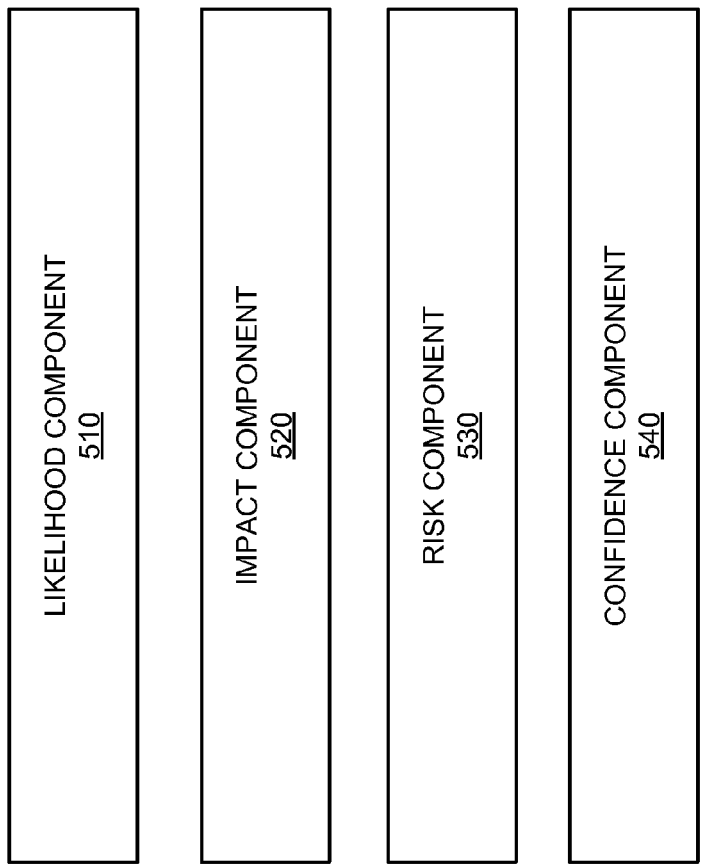
FIG. 5 is a diagram of exemplary functional components of a risk-based correlation device of FIG. 3.

FIG. 5 is a diagram of exemplary functional components of risk-based correlation device 310. As illustrated, risk-based correlation device 310 may include a likelihood component 510, an impact component 520, a risk component 530, and a confidence component 540.

Likelihood component 510 may include one or more components that determine, based on a detected security event, the likelihood that an attack (with which the detected security event is associated) will be successful. In one implementation, likelihood component 510 may determine a likelihood score for a security event based on a threat of the security event and the vulnerabilities found on the customer's assets. Additional details of how a likelihood score for a detected security event may be determined are provided below with respect to FIG. 9.

Impact component 520 may include one or more components that determine, based on a detected security event, the impact that an attack (with which the detected security event is associated) may have on the customer's business. In one implementation, impact component 520 may determine an impact score for a security event based on a vulnerability impact score and an asset impact score.

The vulnerability impact score may be derived from the following vulnerability information: vulnerability scores provided by an external source; vulnerability scores provided through a network administrator; that a security event signature has a threat level but no vulnerability score; and/or that a security event signature has no threat level and no vulnerability score. The asset impact score may be derived by assigning predefined asset profiles for each of the customer's assets. For example, the customer may upload an individual or range of IP addresses of the customer's assets (e.g., via portal device 320) and may select an asset profile for each asset. In one implementation, portal device 320 may allow the customer to identify one or more of the following profiles for an asset: No Impact, Overall Low, Overall Medium, Overall Critical, Confidentiality Critical, Integrity Critical, Availability Critical, Business Critical Web Server, Regular Web Server, Business Critical Application server, Regular Application Server, Business Critical Data Repository, Router/Switch, Firewall, Domain Name Service (DNS) Server, Mail Server, Desktop/Workstation, and/or other types of profiles. Additionally, or alternatively, portal device 320 may allow the customer to provide a confidentiality score, an integrity score, and an availability score for an asset.

The determined impact score may reflect the significance of the impact on confidentiality, integrity, and availability of the customer's devices if the security event were to happen. Additional details of how an impact score for a detected security event may be determined are provided below with respect to FIG. 9.

Risk component 530 may include one or more components that determine, based on a detected security event, the risk of an attack (with which the detected security event is associated) affecting the customer's business. In one implementation, risk component 530 may determine a risk score for a security event based on the likelihood score, determined by likelihood component 510, and the impact score, determined by impact component 520. Additional details of how a risk score for a detected security event may be determined are provided below with respect to FIG. 9.

Confidence component 540 may include one or more components that determine, based on a detected security event, a confidence level of the risk determination provided by risk component 530. In one implementation, confidence component 540 may determine a confidence level of a risk determination for a security event based on a confidence level likelihood score and a confidence level impact score. Additional details of how a confidence level may be determined are provided below with respect to FIG. 9.

Although FIG. 5 shows exemplary functional components of risk-based correlation device 310, in other implementations, risk-based correlation device 310 may include fewer functional components, different functional components, differently arranged functional components, or additional functional components than depicted in FIG. 5. Additionally, or alternatively, one or more functional components of risk-based correlation device 310 may perform the tasks described as being performed by one or more other functional components of risk-based correlation device 310.

Figure 6:
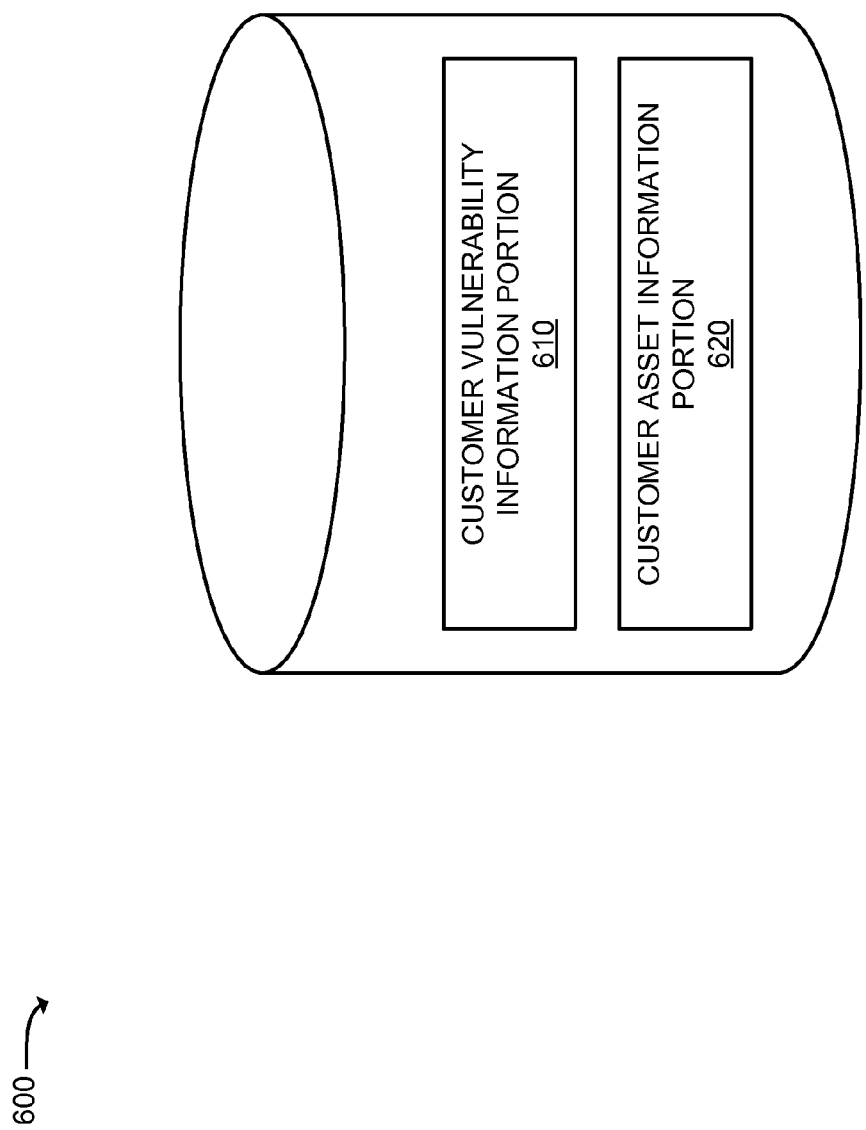
FIG. 6 is a portion of an exemplary computer-readable medium that may be associated with the risk-based correlation device of FIG. 3.

FIG. 6 is a portion of an exemplary computer-readable medium 600 that may be associated with risk-based correlation device 310. Additionally, or alternatively, computer-readable medium 600 may be associated with another device. While one computer-readable medium is described below, it will be appreciated that computer-readable medium 600 may include multiple computer-readable media stored locally at risk-based correlation device 310, or stored at one or more different and possibly remote locations.

As illustrated, computer-readable medium 600 may include a customer vulnerability information portion 610 and a customer asset information portion 620. Customer vulnerability information portion 610 may store information regarding vulnerabilities of the customer's assets. In one implementation, a vulnerability scan may be performed on any customer asset that may send or receive data. In another implementation, the vulnerability scan may be performed on a particular subset of the customer assets that may send or receive data. Each detected vulnerability may be associated with a Common Vulnerabilities and Exposures (CVE) code (e.g., as provided by http://cve.mitre.org). Customer vulnerability information portion 610 may relate customer assets with the CVE codes of the vulnerabilities detected on those assets. For example, if a vulnerability scan determines that file server 218 includes vulnerabilities corresponding to CVE code 1, CVE code 3, and CVE code 10, customer vulnerability information portion 610 may associate these CVE codes with information identifying file server 218. In addition, customer vulnerability information portion 610 may store information identifying a date on which a last scan of the asset was performed.

Customer asset information portion 620 may store customer-provided information regarding the customer's assets. For example, as indicated above, the customer may (e.g., via portal device 320) provide a confidentiality score, an integrity score, and an availability score for an asset. Customer asset information portion 620 may associate the provided confidentiality score, integrity score, and availability score with information identifying the asset.

Although FIG. 6 shows exemplary portions that may be maintained in computer-readable medium 600, in other implementations, computer-readable medium 600 may store fewer portions, different portions, or additional portions than depicted in FIG. 6.

Figure 7:
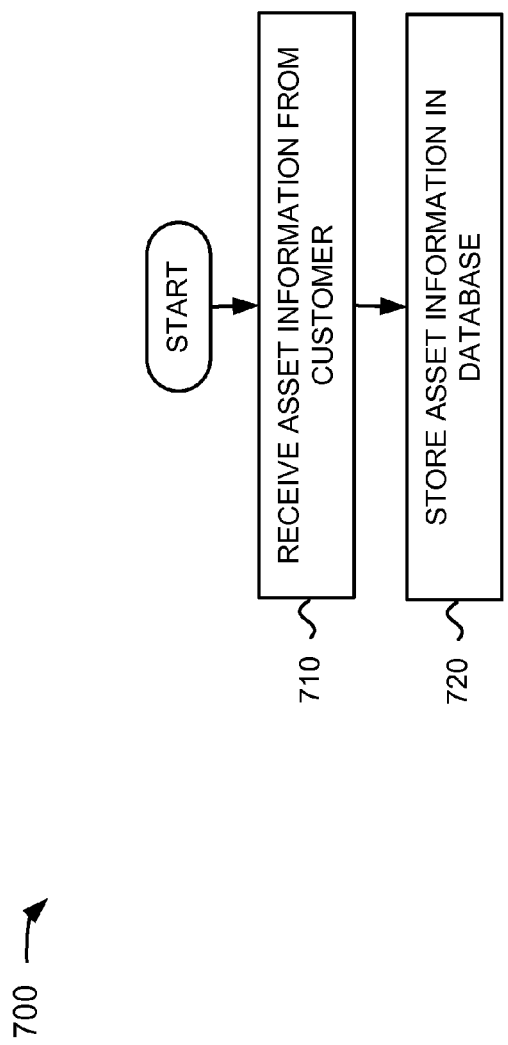
FIG. 7 is a flow chart of an exemplary process for storing customer asset information.

FIG. 7 is a flow chart of an exemplary process 700 for providing asset information. In one embodiment, the processing of FIG. 7 may be performed by portal device 320. In another embodiment, some or all of the processing described below may be performed by one or more devices, including or excluding portal device 320.

Process 700 may include receiving asset information from a customer (block 710). For example, a customer may access portal device 320 for adding asset information. In response, portal device 320 may provide one or more graphical user interfaces to the customer to allow the customer to identify the customer's assets and information identifying a confidentiality score, an integrity score, and an availability score for each asset. As an example and with reference to FIG. 2, the customer may provide a confidentiality score, an integrity score, and an availability score for firewall 212, router 214, accounting server 216, file server 218, HR server 220, and/or user devices 222. The graphical user interfaces may provide information to users via a customized interface (e.g., a proprietary interface) and/or other types of interfaces (e.g., a browser-based interface).

Process 700 may further include storing the asset information in a database (block 720). For example, portal device 320 may associate the information identifying the asset and the confidentiality score, the integrity score, and the availability score for the asset in customer asset information portion 610 of computer-readable medium 600.

Figure 8:
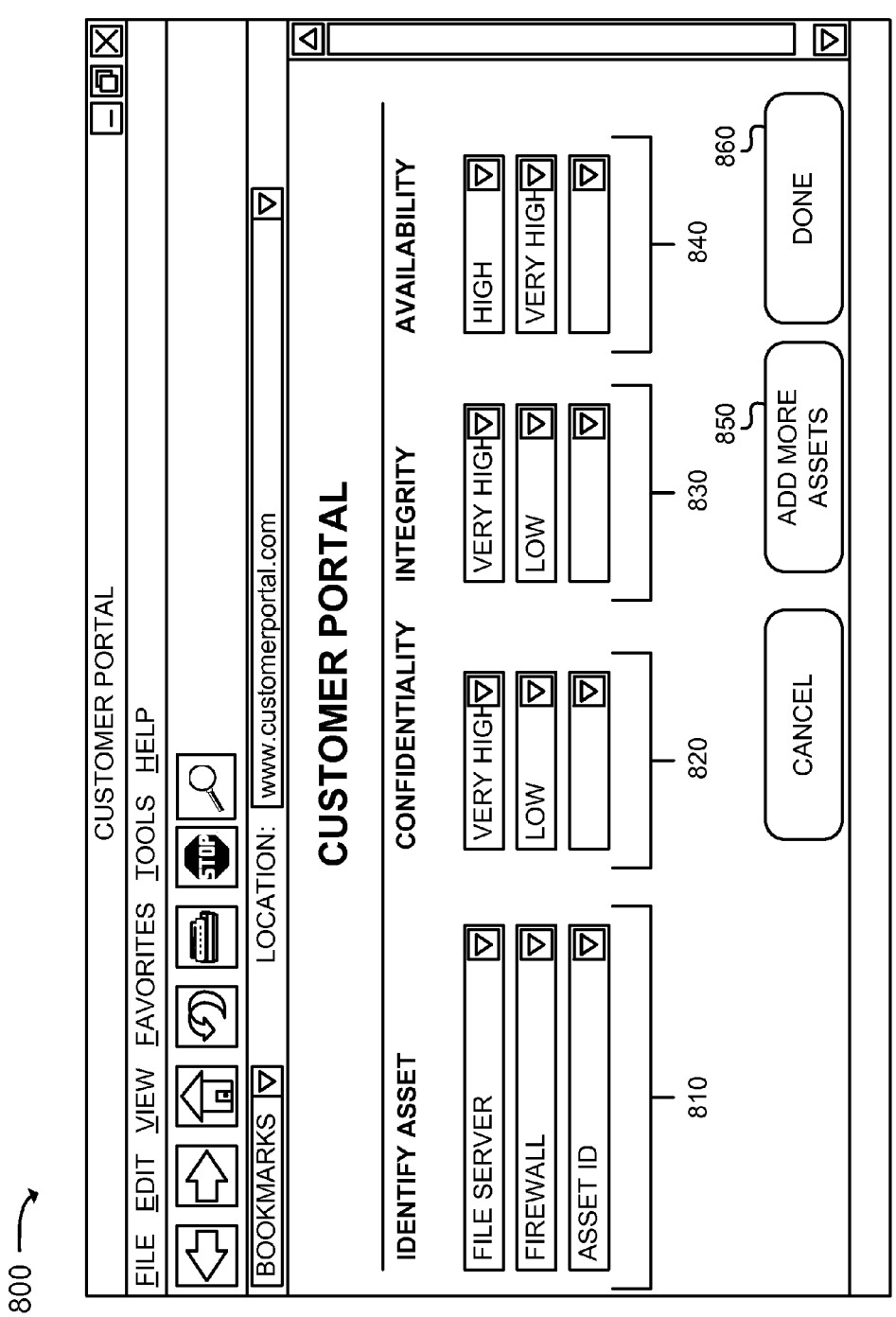
FIG. 8 is an exemplary graphical user interface that may be provided in connection with the process of FIG. 7.

FIG. 8 is an exemplary graphical user interface 800, which may be provided by portal device 320 and to the customer, for providing asset information to security management platform 230. As illustrated, graphical user interface 800 may provide a group of fields 810 that allow the customer to identify the user's assets. The user may identify an asset via a device name, a network address (or range of network addresses), and/or in another way. Each field 810 may allow the customer to identify a single asset or a group of assets. The customer may provide the information identifying an asset in field 810 (e.g., by manually entering the identifying information in field 810) or select the asset from a list of assets. For example, in one implementation, portal device 320 (or another device) may perform a network scan to identify each of the customer's assets that may be accessed via network 240. In this situation, graphical user interface 800 (e.g., field 810) may allow the customer to select an asset via a pull-down menu.

Graphical user interface 800 may allow the customer to specify, for each asset identified in field 810, a confidentiality score 820, an integrity score 830, and an availability score 840. Confidentiality score 820 may provide an indication regarding the importance of keeping secret the data stored on the asset. For example, a customer's file server (such as file server 218) may maintain data files whose confidentiality is extremely important to the customer. Thus, the customer may associate file server 218 with a very high confidentiality score. As a second example, a customer's firewall (such as firewall 212) may not maintain data that is to be kept confidential. Thus, the customer may associate firewall 212 with a low confidentiality score. The confidentiality score may be provided as a level (e.g., very high, high, medium, low, etc.), as a numerical value (e.g., in a range from 0 to 10, where a value of "0" may correspond to a low score and a value of "10" may correspond to a very high score), or in another manner.

Integrity score 830 may provide an indication regarding the importance of protecting the data on the asset against unauthorized modification or destruction. For example, a customer's file server (such as file server 218) may maintain data files whose integrity is extremely important to the customer. Thus, the customer may associate file server 218 with a very high integrity score. As a second example, a customer's firewall (such as firewall 212) may not maintain data that is to be protected. Thus, the customer may associate firewall 212 with a low integrity score. The integrity score may be provided as a level (e.g., very high, high, medium, low, etc.), as a numerical value (e.g., in a range from 0 to 10, where a value of "0" may correspond to a low score and a value of "10" may correspond to a very high score), or in another manner.

Availability score 840 may provide an indication relating to an acceptable time period that a particular asset can be out of service. For example, if the customer determines that an acceptable time period for a first asset is 4 hours, then the first asset may be associated with a medium availability score. As a second example, if the customer determines that an acceptable time period for a second asset (e.g., file server 218) is 2 hours, then the second asset may be associated with a high availability score. As a third example, if the customer determines that an acceptable time period for a third asset (e.g., firewall 212) is less than 10 minutes, then the third asset may be associated with a very high availability score. As a final example, if the customer determines that an acceptable time period for a fourth asset is a business day or more, then the fourth asset may be associated with a low availability score. The availability score may be provided as a level (e.g., very high, high, medium, low, etc.), as a numerical value (e.g., in a range from 0 to 10, where a value of "0" may correspond to a low score and a value of "10" may correspond to a very high score), or in another manner.

Graphical user interface 800 may further include an ADD MORE ASSETS button 850 and a DONE button 860. ADD MORE ASSETS button 850 may allow the customer to provide additional fields 810 to graphical user interface 800 to allow the customer to specify information for additional assets. DONE button 860 may allow the user to store the information entered into graphical user interface 800 in, for example, customer asset information portion 620 of computer-readable medium 600.

Although FIG. 8 shows exemplary fields and buttons that may be provided in graphical user interface 800, in other embodiments, graphical user interface 800 may provide fewer fields and buttons, different fields and buttons, differently arranged fields and buttons, or additional fields and buttons than depicted in FIG. 8.

Figure 9:
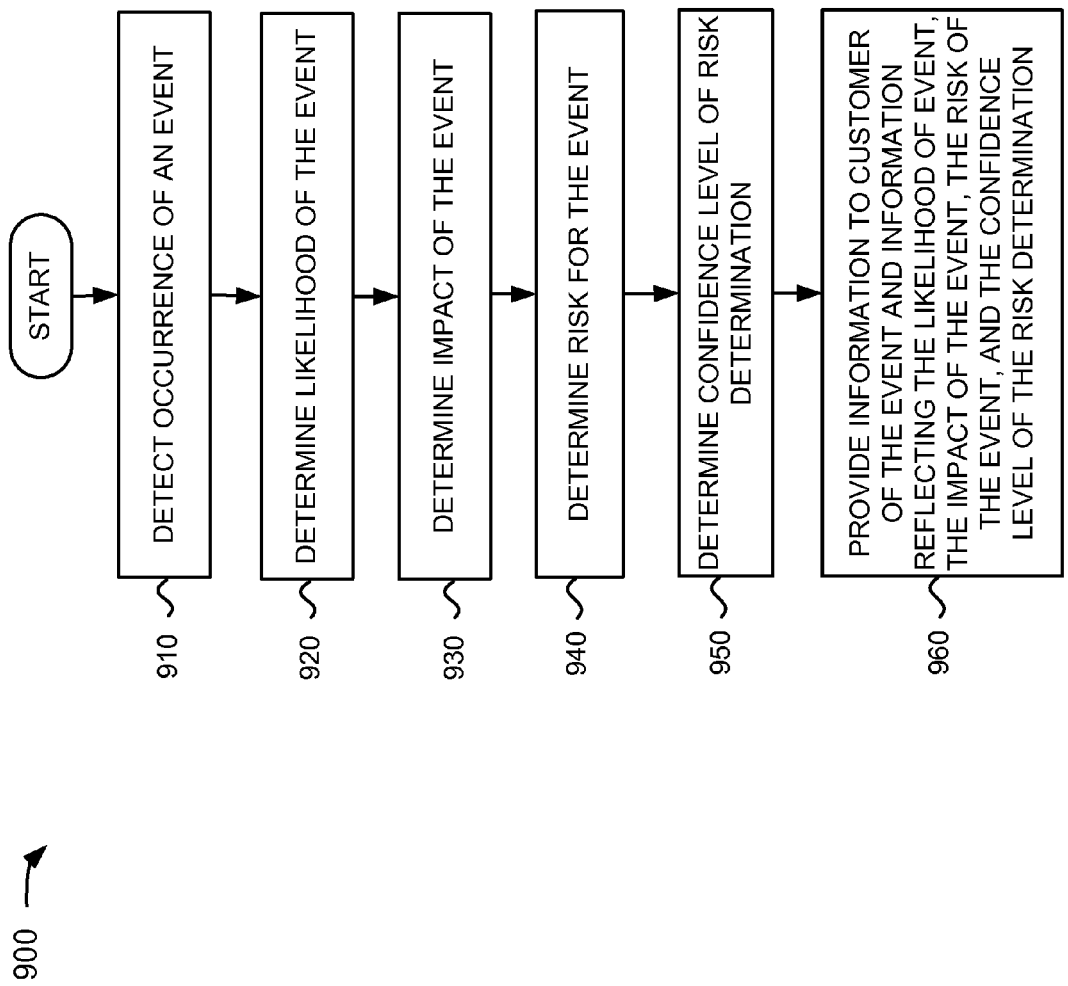
FIG. 9 is a flow chart of an exemplary process for providing security information.

FIG. 9 is a flow chart of an exemplary process 900 for providing security information. In one embodiment, the processing of FIG. 9 may be performed by security management platform 230. In another embodiment, some or all of the processing described below may be performed by one or more devices, including or excluding security management platform 230.

Process 900 may include detecting an occurrence of an event (block 910). For example, security management platform 230 (e.g., risk-based correlation device 310) may detect an event by receiving a security event from customer network 210. In one implementation, firewall 212 and/or an intrusion detection sensor in customer network 210 may detect a security event (e.g., an intrusion, such as a probe, or an attack, such as a denial of service (DoS) attack, an application-layer attack, etc.). The security event may be an event that holds some security information. Once an event is detected, the system, in customer network 210, that detected the event (e.g., firewall 212 or an intrusion detection sensor) may send information relating to the event to security management platform 230 (e.g., to risk-based correlation device 310). The information may include information identifying the asset(s) of customer network 210 to which the traffic relating to the security event was destined, information identifying the source of the traffic, and/or other information relating to the security event. Assume, for explanatory purposes only, that the asset of customer network 210 to which the security event is directed is file server 218.

Process 900 may further include determining a likelihood of the event (block 920). For example, risk-based correlation device 310 (e.g., likelihood component 510) may calculate a Likelihood score (LLH) for the event based on vulnerability information and threat information. In one implementation, likelihood component 510 may determine the likelihood of the event through a triangulation operation (e.g., which may involve matching of CVE codes). As indicated above, a vulnerability scan may be made of the assets in customer network 210. Based on this vulnerability scan, each asset in customer network 210 for which a vulnerability was detected may be associated with the CVE code of the detected vulnerability. For example, assume that the vulnerability scan determined that file server 218 is associated with vulnerabilities having the following CVE codes: CVE code 1, CVE code 3, and CVE code 10. Thus, likelihood component 510 may determine, via a lookup in customer vulnerability information portion 610 of computer-readable medium 600, that file server 218 is associated with CVE code 1, CVE code 3, and CVE code 10. Assuming that the security event is an attack that is trying to exploit a specific vulnerability, the security event (i.e., the threat) may also be associated with a CVE code. Now, suppose that the security event is associated with CVE code 3. Thus, the threat, which is associated with CVE code 3, is directed to an asset (i.e., file server 218 in our example) that has a vulnerability with CVE code 3.

Based on the above analysis, likelihood component 510 may determine a Likelihood score (LLH) for the security event. For example, likelihood component 510 may perform a lookup in a triangulation result table. Table 1 provides an exemplary triangulation result table that may be used by likelihood component 510 to obtain a Likelihood score (LLH) for a security event.

TABLE 1

| TRIANGULATION RESULT | LIKELIHOOD SCORE |
| --- | --- |
| NO SCAN DATA | 0.5 |
| DATA WITH NO MATCH | 0.1 |
| PORT MATCH | 0.65 |
| DIRECT VULNERABILITY MATCH | 0.85 |

In Table 1, a triangulation result of NO SCAN DATA may indicate that no vulnerability scan of the asset was performed. Thus, customer vulnerability information portion 610 does not store a CVE code for the asset. A triangulation result of DATA WITH NO MATCH may indicate that the CVE code(s) associated with the asset does not match the CVE code(s) associated with the security event (threat). A triangulation result of PORT MATCH may indicate that a port on the asset matches a port exploited by the security event. For example, assuming that the security event uses port 80 and is directed to an asset that has port 80 open (e.g., as determined by a vulnerability scan), likelihood component 510 may determine that a port match exists. A triangulation result of DIRECT VULNERABILITY MATCH may indicate that a CVE code associated with the asset matches the CVE code associated with the security event (threat). In our example above, likelihood component 510 may determine that the triangulation result is DIRECT VULNERABILITY MATCH since CVE code 3 is associated with file server 318 and the security event. Thus, likelihood component 510 may obtain a Likelihood score (LLH) of 0.85 for the security event. Other values may alternatively be used in Table 1.

As further shown in FIG. 9, process 900 may also include determining an impact of the event (block 930). For example, risk-based correlation device 310 (e.g., impact component 520) may calculate an Impact score (I) for the event based on a Confidentiality Impact score (Ic), an Integrity Impact score (Ii), and an Availability Impact score (Ia). Impact component 520 may determine the Confidentiality Impact score (Ic), the Integrity Impact score (Ii), and the Availability Impact score (Ia) as follows:

Confidentiality Impact $(Ic)$=Vulnerability Confidentiality Impact score×Asset Confidentiality Impact score Integrity Impact $(Ii)$=Vulnerability Integrity Impact score×Asset Integrity Impact score Availability Impact $(Ia)$=Vulnerability Availability Impact score×Asset Availability Impact score.

As described above, an asset may be determined to be associated with one or more vulnerabilities, where each vulnerability may be associated with a CVE code. Impact component 520 may use a CVE code to determine a Common Vulnerability Scoring System (CVSS) code (e.g., from http://www.first.org/cvss), which indicates whether the vulnerability aims to exploit the confidentiality, the integrity, and/or the availability of the data in the asset. Thus, for example, an asset may have a vulnerability that, if exploited, would give an attacker access to the asset (meaning that the attacker can specifically compromise the confidentiality and the integrity of the data on the asset). This type of vulnerability would then be determined to affect the confidentiality and integrity of the asset. An asset may also have a vulnerability that, if exploited, may cause the asset to stop functioning. This type of vulnerability would then be determined to affect the availability of the asset. In this way, impact component 520 may determine the Vulnerability Confidentiality Impact score, the Vulnerability Integrity Impact score, and the Vulnerability Availability Impact score for a security event based on a lookup of the corresponding CVSS codes.

As described above with respect to FIGS. 7 and 8, the customer may provide confidentiality, integrity, and availability indications for the assets in customer network 210. For example, as illustrated in FIG. 8, the customer has assigned a very high confidentiality indication, a very high integrity indication, and a high availability indication to file server 218. Impact component 520 may assign values to these indications to obtain the Asset Confidentiality Impact score, the Asset Integrity Impact score, and the Asset Availability Impact score. Table 2 provides exemplary values that may be provided for different customer confidentiality, integrity, and availability indications.

TABLE 2

| INDICATION | VALUE |
|---|---|
| NONE | 0 |
| LOW | 0.3 |
| MEDIUM | 0.5 |
| HIGH | 0.8 |
| VERY HIGH | 1.0 |

Using the determined Vulnerability Confidentiality Impact score and the determined Asset Confidentiality Impact score, impact component 520 may determine the Confidentiality Impact (Ic). Using the determined Vulnerability Integrity Impact score and the determined Asset Integrity Impact score, impact component 520 may determine the Integrity Impact (Ii). In addition, using the determined Vulnerability Availability Impact score and the determined Asset Availability Impact score, impact component 520 may determine the Availability Impact (Ia). Impact component 520 may then determine the overall Impact score (I) of the security event as follows:

$$I = \sqrt{I_c^2 + I_i^2 + I_a^2}.$$

In one implementation, impact component 520 may, for example, normalize the overall Impact score (I) as follows:

$$I = \frac{I}{\sqrt{3}}$$

Returning to FIG. 9, process 900 may include determining a risk for the event (block 940). For example, risk-based correlation device 310 (e.g., risk component 530) may calculate a Risk score (R) for the event based on a Confidentiality Risk score (Rc), an Integrity Risk score (Ri), and an Availability Risk score (Ra). Risk component 530 may determine the Confidentiality Risk score (Rc), the Integrity Risk score (Ri), and the Availability Risk score (Ra) as follows:

Confidentiality Risk (Rc)=Likelihood score (LLH)×
Confidentiality Impact score (Ic)

Integrity Risk (Ri)=Likelihood score (LLH)×Integrity
Impact score (Ii)

Availability Risk (Ra)=Likelihood score (LLH)×Availability Impact score (Ia).

Risk component 530 may determine the overall Risk score (R) for the security event as follows:

$$R = \sqrt{R_c^2 + R_i^2 + R_a^2}$$

In one implementation, risk component 530 may, for example, normalize the overall Risk score (R) as follows:

$$R = \frac{R}{\sqrt{3}}$$

Process 900 may further include determining a confidence level of the risk determination (block 950). For example, risk-based correlation device 310 (e.g., confidence component 540) may calculate a Confidence Level of the Risk score (CLR) for the event based on a Confidence Level of the Likelihood score (CLLLH) and a Confidence Level of the Impact score (CLI).

Confidence component 540 may determine the Confidence Level of the Likelihood score (CLLLH) based, for example, on a lookup in a triangulation result table. Table 3 provides an exemplary triangulation result table that may be used by confidence component 530 to obtain the Confidence Level of the Likelihood score (CLLLH) for a security event.

TABLE 3

| TRIANGULATION RESULT | CLLLH |
|---|---|
| NO SCAN DATA | 0.1 |
| DATA WITH NO MATCH | 0.7 |
| PORT MATCH | 0.5 |
| DIRECT VULNERABILITY MATCH | 0.7 |

In Table 3, a triangulation result of NO SCAN DATA may indicate that no vulnerability scan of the asset was performed. Thus, customer vulnerability information portion 610 does not store a CVE code for the asset. A triangulation result of DATA WITH NO MATCH may indicate that the CVE code(s) associated with the asset does not match the CVE code(s) associated with the security event (threat). A triangulation result of PORT MATCH may indicate that a port on the asset matches a port exploited by the security event. A triangulation result of DIRECT VULNERABILITY MATCH may indicate that a CVE code associated with the asset matches the CVE code associated with the security event (threat). Other values may alternatively be used in Table 3.

In one implementation, the values in Table 3 may be aged based on the date when the last vulnerability scan was performed. In those situations where the triangulation result indicates NO SCAN DATA, confidence component 540 may not age the value in Table 3. For all other triangulation results, confidence component 540 may age the values in Table 3 based on the age of the last vulnerability scan. For example, a minimum aging value (Amin) and a maximum aging value (Amax) may be set. Confidence component 540 may age the Confidence Level of the Likelihood score (CLLLH) during the period between Amin and Amax. For example, when the age of the vulnerability scan is less than Amin, confidence component 540 may set the Confidence Level of the Likelihood score (CLLLH) to a maximum CLLLH value (CLLLHmax). The maximum CLLLH value may correspond to the value set forth in Table 3 above. When the age of the vulnerability scan is greater than or equal to Amax, confidence component 540 may set the Confidence Level of the Likelihood score (CLLLH) to a minimum CLLLH value (CLLLHmin). The minimum CLLLH value may correspond to the value for NO SCAN DATA in Table 3 above (i.e., a value of 0.1). When the age of the vulnerability scan is greater than or equal to Amin and less than Amax, confidence component 540 may determine the Confidence Level of the Likelihood score (CLLLH) as follows:

$$CLLLH = \frac{CLLLH_{max} - (CLLLH_{max} - CLLLH_{min})(\text{scan age} - A_{min})}{(A_{max} - A_{min})}.$$

Exemplary values of Amax and Amin for different triangulation results are provided in Table 4.

TABLE 4

| TRIANGULATION RESULT | Amin | Amax |
|---|---|---|
| DATA WITH NO MATCH | 1 month | 6 months |
| PORT MATCH | 1 month | 6 months |
| DIRECT VULNERABILITY MATCH | 2 months | 8 months |

Confidence component 540 may determine the Confidence Level of the Impact score (CLI) based, for example, on a Confidence Level Vulnerability score (CLV) and a Confidence Level Asset Impact score (CLH). Confidence component 540 may determine the Confidence Level Vulnerability score (CLV) based, for example, on a lookup in a vulnerability source table. Table 5 provides an exemplary vulnerability source table that may be used by confidence component 530 to obtain the Confidence Level Vulnerability score (CLV) for a security event.

TABLE 5

| VULNERABILTY SOURCE | CLV |
|---|---|
| VENDOR CVSS SCORE | 0.7 |
| ADMIN PROVIDED VULNERABILITY SCORE | 0.9 |

If CVSS vulnerability scores are used for calculating the vulnerability impacts, as described above with respect to block 930, confidence component 540 may assign a value of 0.7 to the Confidence Level Vulnerability score (CLV). If, on the other hand, the vulnerability scores used for calculating the vulnerability impacts are provided by a network administrator (e.g., associated with security management platform 230), confidence component 540 may assign a value of 0.9 to the Confidence Level Vulnerability score (CLV). Other values may alternatively be used.

Confidence component 540 may set the Confidence Level Asset Impact score (CLH) to a fixed value. In one implementation, the fixed value may be 0.5. Confidence component 540 may determine the Confidence Level of the Impact score (CLI) as follows:

$CLI=CLV \times CLH.$

In addition, confidence component 540 may determine the Confidence Level of the Risk score (CLR) as follows:

$CLR=CLLLH \times CLI.$

As further shown in FIG. 9, process 900 may further include providing information to the customer relating to the event and information reflecting the likelihood of the event, the impact of the event, the risk of the event, and the confidence level of the risk determination (block 960). For example, risk-based correlation device 310 may include a set of rules, where the rules indicate how particular security events are to be handled. For example, a rule may specify that if the Risk score (R) is above a first threshold and the Confidence Level of the Risk score (CLR) is above a second threshold, then the security event should be classified as a security incident, meaning that the security event is serious enough that the event may be worth investigating. In addition, a rule may be provided that indicates that in such a situation (e.g., where a particular security event is classified as a security incident), risk-based correlation device 310 is to notify portal device 320, which may, in turn, send a notification to the customer that a security incident has been detected. Additionally, or alternatively, portal device 320 may send a notification to a network administrator associated with security management platform 230. In either event, the notification may provide details regarding the detected security event and instruct the customer that additional details may be obtained by accessing portal device 320.

When the customer accesses portal device 320, portal device 320 may provide one or more graphical user interfaces to the customer that provide details of the security event. The notification and/or the graphical user interface may provide an indication of the determined Likelihood score (LLH), the determined Impact score (I), the determined Risk score (R), and the determined Confidence Level of the Risk score (CLR).

Figure 10:
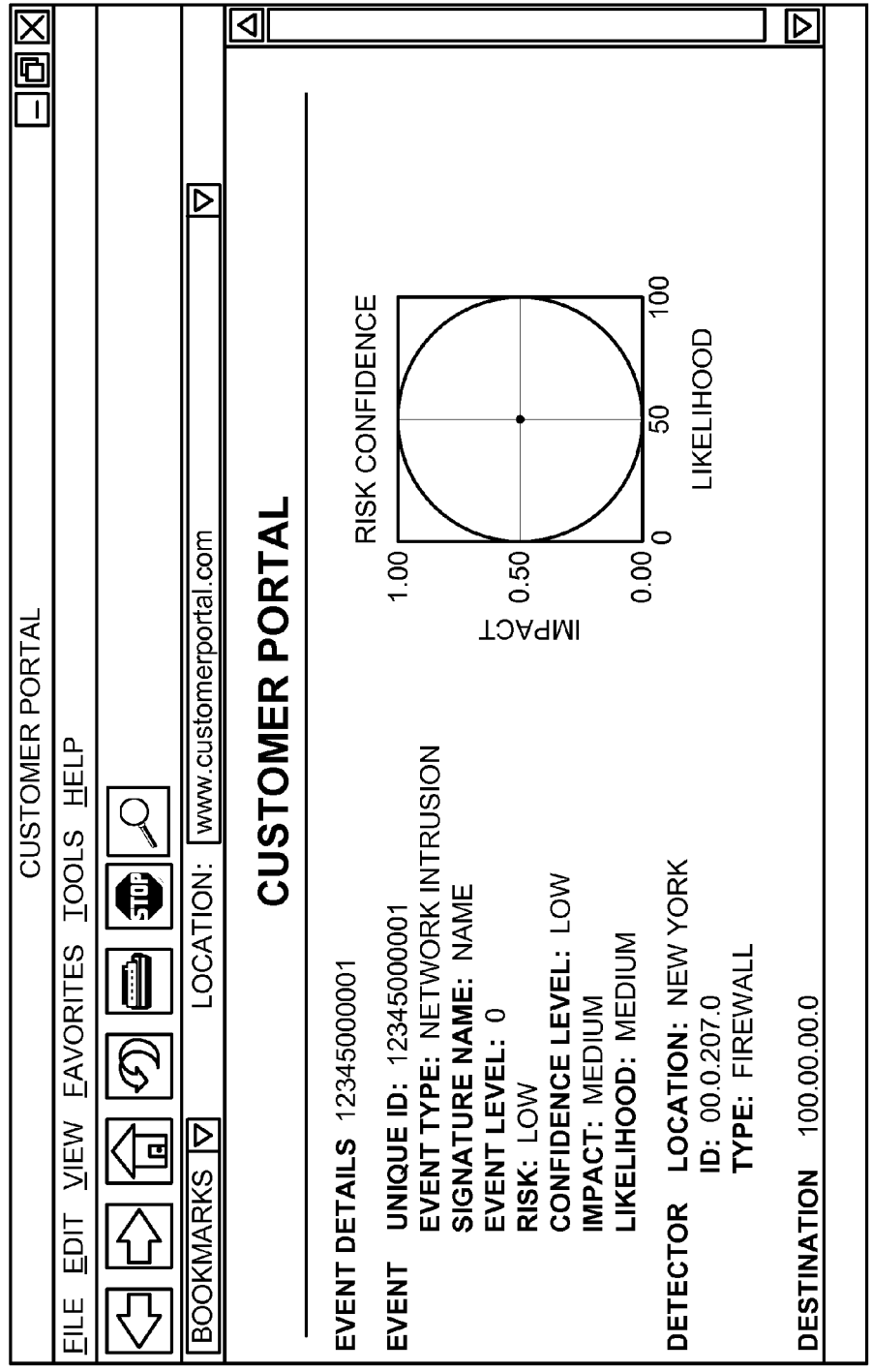
FIG. 10 is an exemplary graphical user interface that may be provided in connection with the process of FIG. 9.

FIG. 10 is an exemplary graphical user interface 1000 that may be provided to the customer in relation to process described in FIG. 9. As illustrated, graphical user interface 1000 may allow a customer to obtain information regarding a particular security event. For example, graphical user interface 1000 may provide information identifying the type of the detected security event; a signature name for the security event; an event level (e.g., which may relate to a manual classification of the security event by an administrator of security management platform 230); information relating to the Risk score (R); information relating to the Confidence Level for Risk score (CLR); information relating to the Impact score (I); information relating to the Likelihood score (LLH); information identifying the geographical area where the security event was detected; information identifying the network device that detected the event; information identifying the type of network device that detected the event; and information identifying the network device to which the security event was directed. In addition, graphical user interface 1000 may include a graphical image that reflects the confidence of the risk score.

The information relating to the Risk score (R), the information relating to the Confidence Level for Risk score (CLR), the information relating to the Impact score (I), and/or the information relating to the Likelihood score (LLH) may be provided in graphical user interface 1000 as textual information (e.g., as low, medium, high, very high, etc.) and/or numerical values. In the latter situation, a portal device 320 may include one or more tables that convert numerical values to textual information. Table 6 is a table of exemplary values that may be used for converting a numerical Risk score (R) and/or a numerical Impact score (I) to textual information.

TABLE 6

| VALUE | TEXT |
|---|---|
| <0.3 | LOW |
| >=0.3 | MEDIUM |
| >=0.6 | HIGH |
| >=0.8 | CRITICAL |

Table 7 is a table of exemplary values that may be used for converting a numerical Likelihood score (L) and/or a numerical Confidence Level for Risk score (CLR) to textual information.

TABLE 7

| VALUE | TEXT |
|---|---|
| <0.3 | LOW |
| >=0.3 | MEDIUM |
| >=0.7 | HIGH |

Although FIG. 10 shows exemplary information that may be provided in graphical user interface 1000, in other embodiments, graphical user interface 1000 may provide less information, different information, differently arranged information, or additional information than depicted in FIG. 10.

The foregoing description provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 7 and 9, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

It should be emphasized that the term "comprises/comprising" when used in this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
a device to:
detect an occurrence of a security event in a network, the security event being directed to another device associated with the network,
determine, for the detected security event, a likelihood score that provides an indication of a likelihood that the security event will succeed,
determine, for the detected security event, an impact score that provides an indication of an impact that the security event will have on the network,
the impact score being determined based on:
a confidentiality score relating to maintaining a confidentiality of data stored by the other device,
an integrity score relating to maintaining an integrity of the data stored by the other device, and
an availability score relating to maintaining the other device in an operating state,
determine a confidentiality risk score based on the likelihood score and the confidentiality score,
determine an integrity risk score based on the likelihood score and the integrity score,
determine an availability risk score based on the likelihood score and the availability score,
determine, for the detected security event, a risk score that provides an indication of a risk that the security event will affect the network,
the risk score being determined based on a mathematical combination of the confidentiality risk score, the integrity risk score, and the availability risk score, and
provide, to a user associated with the network, the indication provided by the risk score, the indication provided by the likelihood score, and the indication provided by the impact score.

2. The system of claim 1, where, when detecting the occurrence of the security event, the device is to:
detect a network intrusion event in the network, and
where the device is further to:
provide, to the user, information identifying the other device.

3. The system of claim 1, where, when determining the likelihood score, the device is to:
determine the likelihood score based on vulnerabilities associated with the other device and a vulnerability associated with the security event.

4. The system of claim 1, where, when determining the impact score, the device is to:
determine the impact score further based on vulnerabilities associated with the other device.

5. The system of claim 4, where the device is further to determine the vulnerabilities associated with the other device based on Common Vulnerability Scoring System (CVSS) codes.

6. The system of claim 4, where the device is further to:
receive, from the user and prior to detecting the occurrence of the security event, an indication relating to maintaining the confidentiality of the data stored in the other device, an indication relating to maintaining the integrity of the data stored in the other device, and an indication relating to maintaining the other device in the operating state.

7. The system of claim 1, where, when determining the risk score, the device is to:
determine the risk score by multiplying the likelihood score by the impact score.

8. The system of claim 1, where the device is further to:
determine a confidence level of the determination of the risk score, and
provide an indication of the confidence level to the user.

9. The system of claim 8, where, when determining the confidence level, the device is to:
determine the confidence level based on a time period since a vulnerability scan was last performed on the other device.

10. A method comprising:
receiving, by a security device, information relating to a security event in a network, the security event being directed to a device, of a user, associated with the network;
calculating, by the security device and after receiving the information, a likelihood score that provides an indication of a likelihood that the security event will succeed;

calculating, by the security device and after receiving the information, an impact score that provides an indication of an impact that the security event will have on the network,
    the impact score being calculated based on:
        a confidentiality impact score relating to maintaining a confidentiality of data stored by the device,
        an integrity impact score relating to maintaining an integrity of the data stored by the device, and
        an availability impact score relating to maintaining the device in an operating state;
calculating, by the security device, a risk score,
    calculating the risk score includes calculating:
        a confidentiality risk score based on the likelihood score and the confidentiality impact score,
        an integrity risk score based on the likelihood score and the integrity impact score, and
        an availability risk score based on the likelihood score and the availability impact score,
    the risk score being calculated based on a mathematical combination of the confidentiality risk score, the integrity risk score, and the availability risk score,
    the risk score providing an indication of a risk that the security event will affect the network; and
providing, by the security device, a user interface to the user,
    the user interface including:
        the indication provided by the likelihood score,
        the indication provided by the impact score, and
        the indication provided by the risk score.

11. The method of claim 10, where calculating the likelihood score includes:
calculating the likelihood score based on vulnerabilities associated with the device and a vulnerability associated with the security event, and
converting a value of the likelihood score to textual information identifying the indication of the likelihood that the security event will succeed,
    the indication provided by the likelihood score including the textual information.

12. The method of claim 10, where calculating the impact score includes:
calculating the impact score further based on:
    vulnerabilities associated with the device, and
converting a value of the impact score to textual information identifying the indication of the impact,
    the indication provided by the impact score including the textual information.

13. The method of claim 12, further comprising:
determining the vulnerabilities associated with the device based on Common Vulnerability Scoring System (CVSS) codes.

14. The method of claim 10, further comprising:
receiving, by the security device prior to receiving the information relating to the security event and from the user, an indication relating to maintaining the confidentiality of the data stored by the device, an indication relating to maintaining the integrity of the data stored by the device, and an indication relating to maintaining the device in the operating state.

15. The method of claim 10, further comprising:
converting a value of the risk score to textual information identifying the indication of the risk,
    the indication provided by the risk score including the textual information.

16. The method of claim 10, further comprising:
determining a confidence level of the risk score; and
providing the confidence level, to the user, in the user interface.

17. The method of claim 16, where determining the confidence level includes:
determining the confidence level based on a time period since a vulnerability scan was last performed on the device.

18. A non-transitory computer-readable medium for storing instructions, the instructions comprising:
one or more instructions which, when executed by a security device, cause the security device to receive information regarding a plurality of devices in a network,
    the information including, for each device of the plurality of devices, a confidentiality score that provides an indication of an importance of maintaining a confidentiality of data stored by the device, an integrity score that provides an indication of an importance of maintaining an integrity of the data stored by the device, and an availability score that provides an indication of an importance of maintaining the device in an operating state;
one or more instructions which, when executed by the security device, cause the security device to detect an occurrence of a security event, in the network, directed to a particular device of the plurality of devices;
one or more instructions which, when executed by the security device, cause the security device to determine a likelihood score that provides an indication of a likelihood that the security event will succeed;
one or more instructions which, when executed by the security device, cause the security device to determine an impact score that provides an indication of an impact that the security event will have on the network,
    the impact score being determined based on:
        the confidentiality score of the particular device,
        the integrity score of the particular device, and
        the availability score of the particular device;
one or more instructions which, when executed by the security device, cause the security device to determine a risk score indicating a risk of the security event affecting the network,
    the one or more instructions to determine the risk score including one or more instructions which, when executed by the security device, cause the security device to determine:
        a confidentiality risk score based on the likelihood score and the confidentiality score of the particular device,
        an integrity risk score based on the likelihood score and the integrity score of the particular device, and
        an availability risk score based on the likelihood score and the availability score of the particular device,
    the risk score, indicating the risk of the security event, being determined based on a mathematical combination of the confidentiality risk score, the integrity risk score, and the availability risk score; and
one or more instructions which, when executed by the security device, cause the security device to provide to a user associated with the particular device:
    an indication relating to the risk score,
    an indication relating to the likelihood score, and
    an indication relating to the impact score.

19. The non-transitory computer-readable medium of claim 18, where the security event includes a network attack and the risk score indicates a risk of the network attack affecting the network, and
- where the one or more instructions to determine the likelihood score include:
  - one or more instructions to determine the likelihood score based on vulnerabilities associated with the particular device.

20. The non-transitory computer-readable medium of claim 18,
- the instructions further comprising:
  - one or more instructions to determine a confidence level of the risk score, and
  - one or more instructions to provide the confidence level.

21. The non-transitory computer-readable medium of claim 20, where the one or more instructions to determine the confidence level include:
- one or more instructions to determine the confidence level based on a time period since a vulnerability scan was last performed on the particular device.

* * * * *